(12) United States Patent
Noguchi et al.

(10) Patent No.: US 6,569,919 B1
(45) Date of Patent: May 27, 2003

(54) COMPOSITION EXHIBITING REVERSIBLE COLOR CHANGE AND EXTERIOR PARTS FOR CLOCK USING THE SAME

(75) Inventors: Koichi Noguchi, Chiba (JP); Takayoshi Tanaka, Chiba (JP); Kiichiro Morita, Saitama (JP); Yasuhisa Ikeda, Saitama (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/646,327

(22) PCT Filed: Mar. 31, 1999

(86) PCT No.: PCT/JP99/01685

§ 371 (c)(1),
(2), (4) Date: Nov. 16, 2000

(87) PCT Pub. No.: WO99/51680

PCT Pub. Date: Oct. 14, 1999

(30) Foreign Application Priority Data

| Mar. 31, 1998 | (JP) | 10-087027 |
| Mar. 31, 1998 | (JP) | 10-087030 |
| Mar. 9, 1999 | (JP) | 11-061875 |

(51) Int. Cl.$^7$ .............. C09D 11/02; C08K 3/22; C08L 25/04; C08L 9/02; C08L 33/08; C08L 39/00; C08L 75/04; C08L 83/00
(52) U.S. Cl. ............ 523/160; 524/403; 524/555; 524/556; 524/571; 524/577; 524/588; 524/590
(58) Field of Search .............. 523/160, 161; 524/403, 413, 431, 577, 555, 556, 557, 563, 589, 590, 571, 588

(56) References Cited

U.S. PATENT DOCUMENTS

| 4,038,814 A | * | 8/1977 | Niida | 368/69 |
| 4,684,264 A | * | 8/1987 | Paperno et al. | 368/283 |
| 5,618,768 A | * | 4/1997 | Higuchi et al. | 501/92 |
| 6,156,471 A | * | 12/2000 | Kobori et al. | 430/110 |
| 6,190,780 B1 | * | 2/2001 | Shoji et al. | 428/472 |

FOREIGN PATENT DOCUMENTS

| JP | 49116111 | * | 11/1974 |
| JP | 51087059 | * | 7/1976 |
| JP | 52082684 | * | 7/1977 |
| JP | 60137965 | * | 7/1985 |
| JP | 60260634 | * | 12/1985 |
| JP | 61175601 | * | 8/1986 |
| JP | 62078127 | | 4/1987 |
| JP | 05254830 | * | 10/1993 |
| JP | 05279610 A | * | 10/1993 |
| JP | 06138316 | * | 5/1994 |
| JP | 07179698 | * | 7/1995 |

OTHER PUBLICATIONS

English Translation of JP60137965 (1985).*

English Translation of JP 05254830 (1993).*

* cited by examiner

Primary Examiner—Callie Shosho
(74) Attorney, Agent, or Firm—Adams & Wilks (57) ABSTRACT

A reversibly discoloring ink composition which changes color reversibly and instantly in response to irradiation with light of a given wavelength distribution. The discoloring composition has fine particles comprised of one or more rare earth oxides represented by the general formula $M_2O_3$, wherein M is Ho, Nd, or Pr, and a light-transmissive base material having the fine particles dispersed therein. In an embodiment, a color changing decorative layer formed of the reversibly discoloring ink is printed on the upper layer of a dial plate or other wristwatch part.

21 Claims, 7 Drawing Sheets

COMPOSITION EXHIBITING REVERSIBLE COLOR CHANGE AND EXTERIOR PARTS FOR CLOCK USING THE SAME

CROSS-REFERENCE TO RELATED APPLICATIONS

This application is U.S. national stage application of copending International Application Ser. No. PCT/JP99/01685, filed on Mar. 31, 1999 and published in a non-English language.

TECHNICAL FIELD

The present invention relates to a reversibly discoloring composition capable of reversibly changing color according to the wavelength of an external light source and a member using the composition used as external decorating parts of dial plates, bands, etc., for wrist watches, and has a feature that the object color of the member reversibly and instantly changes color according to the wavelength of an external light source.

BACKGROUND OF THE INVENTION

Heretofore, as a substance characterized in that the color of the compound undergoes reversible discoloring by light irradiation, a photochromic molecule is known. By absorbing the energy of light irradiation, the photochromic molecule changes chemical structure and as the result thereof, the color of the compound is changed. As the photochromic molecule, spiropyran, in which the object color changes from colorless to blue-purple or red-purple by an ion dissociation, thioindigo, in which the object color changes from a purple color to a red color by a trans-cis isomerization, fulgide and dihydropyrene, in which the object color changes from colorless to a pink color by an electrocyclic reaction, triphenylimidazolyl, in which the object color changes by a radical dissociation, a thionine-base photochromic molecule, in which the object color changes by oxidation reduction, etc., are known. An example of using a photochromic molecule as a coloring material, that is a light-discoloring ink, is disclosed in U.S. Pat. No. 5,028,792 (WO 94/23062). As other uses than the above-described uses, dyeing is applied to a part of a clothing ornament using a photochromic molecule as a dye and a clothing ornament causing color changing in the portion, etc., is known.

However, in the case of using such a photochromic molecule as a coloring material, there are many cases that the reversibility of the color change is imperfect and the time required for color changing is long. Also, when the change of color by the absorption of light is repeatedly carried out, a photo-deterioration such as vanishing of reversibility of color change, etc., occurs, and further, by heat or the ultraviolet irradiation of a long time, the reversibility of color change is frequently vanished, and the photochromic molecule is not suitable for the storage for a long period of time. As described above, when the photochromic molecule of prior art is used as an external decorating part for watch, it sometimes difficult to ensure the satisfactory quality. Also, because the color change depends upon the chemical structure, the color can be changed only between colorless and one color or between two colors.

The present invention has been made in view of such circumstances and the problems of the invention are to supply easily and at a low cost an external decorating part for a watch using a member that the object color is instantly and reversibly changes according to the kind of a light source and further to ensure the quality such as the light resistance, the heat resistance, etc.

DISCLOSURE OF THE INVENTION

The reversibly discoloring composition of the invention for solving the problems is composed of fine particles made of one or more kinds of rare earth oxides represented by a formula $M_2O_3$ (wherein M represents Ho, Nd, or Pr) and a light-transmitting base material having dispersed therein the fine particles.

In this case, in the rare earth oxide fine particles in the invention, the mean particle size is from about a few $\mu$m to 100 $\mu$m but it is preferred to use super fine particles having the means particle size of from 5 nm to 100 nm. When such super fine particles are used, the characteristics that the change of the color tone is large and dispersibility is good are shown and even by using the same rare earth oxide, a reversibly discoloring layer having a different color tone can be formed. In addition, the fine particles having different mean particle size may be mixed, whereby the variation of expressible colors can be increased. In addition, the fine particles having different mean particle size may be mixed, whereby the variation of expressible colors can be increased.

The light-transmitting base material in the invention includes, for example, inks or coating materials selected from an epoxymelamine-base high molecular material, a vinyl-base high molecular material, an acrylic high molecular material, a urethane-base high molecular material, a polyamide-base high molecular material, an alkid-base high molecular material, a photo-setting type high molecular material, and a high molecular material having a light transmittance. In this case, the material having a light transmittance means that the visible light transmittance of the material is at least 90%.

Also, the light-transmitting base material of the invention includes, for example, a molding material selected from an acrylic high molecular material, a polycarbonate high molecular material, an ABS high molecular material, a polyarylate high molecular material, a urethane-base high molecular material, a styrene-base high molecular material, a silicone-base high molecular material, and a high molecular material having a light transmittance. In this case, the material having a light transmittance means that the visible light transmittance of the material is at least 90%.

In the present invention, to 100 parts by weight of the light-transmitting base material, from 1 to 30 parts by weight of the rare earth oxide fine particles can be used but particularly, when the light-transmitting base material is a base material for ink, to 100 parts by weight of the base material, the rare earth oxide fine particles can be used in the range of from 1 to 50 parts by weight.

Also, to improve the dispersibility, if necessary, additives such as a wetting agent, etc., may be added.

The reversibly discoloring composition of the invention can be used for various kinds of uses but particularly, is suitably used as external decorating parts for watches, such as a dial plate, a frame, a band, a bezel, a button, etc., for watches. That is, the external decorating part for watch of the invention has the color changing portion composed of a light-transmitting base material having dispersed therein fine particles of one or more kinds of rare earth oxides represented by the formula $M_2O_3$ (wherein M represents Ho, Nd, or Pr).

In this case, the rare earth oxide fine particles and the light-transmitting base material are as described above, but according to the kind of the light-transmitting base material, the forming method of the color changing portion differs.

For example, the color changing portion is formed by printing or coating a transparent ink or a transparent coating material containing the rare earth oxide fine particles or formed by molding a transparent molding material containing the rare earth oxide fine particles. Practically, a high molecular material layer containing the rare earth oxide fine particles is formed in an optional form by printing b such as screen printing, etc., or coating on a dial plate, etc., which is an external decorating part for a watch. Also, it is possible that after dispersing a proper amount of the rare above-described earth oxide fine particles in a transparent resin such as a polycarbonate resin, a urethane resin, etc., pellets are formed from the dispersion, and thereafter, by applying a molding work such as injection molding, etc., the pellets are molded to a desired form, which is used as an external decorating part for a watch or a member of the external decorating part for a watch.

The color changing portion thus formed changes the color thereof reversibly and instantly according to the kind of an external light source such as sunlight, an ordinary type fluorescent lamp, a three-wavelength region light-emitting type fluorescent lamp, etc.

Such a color changing portion may be used as a part of the member or may be used as the whole portion. Also, the color changing portion may be covered with the transparent layer or member made of a light-transmitting material. In this case, at the surrounding of the color changing portion may be formed color members of almost the same color as the changed color formed by the color changing portion by the light of a specific external light source.

The rare earth oxide contained in the reversibly discoloring composition of the invention has the feature in the reflected spectral distribution. That is, the rare earth oxide has plural absorption peaks in a visible light region. These absorption peaks are caused by the absorption of the ion of the rare earth element M contained in the oxide shown by the above-described formula $M_2O_3$ and the diffraction-scattering by the fine particles. As an example,f the diffusion reflection spectral characteristics of $Ho_2O_3$ having a mean particle size of about 2 $\mu$m are shown in FIG. 1.

Figure 1:
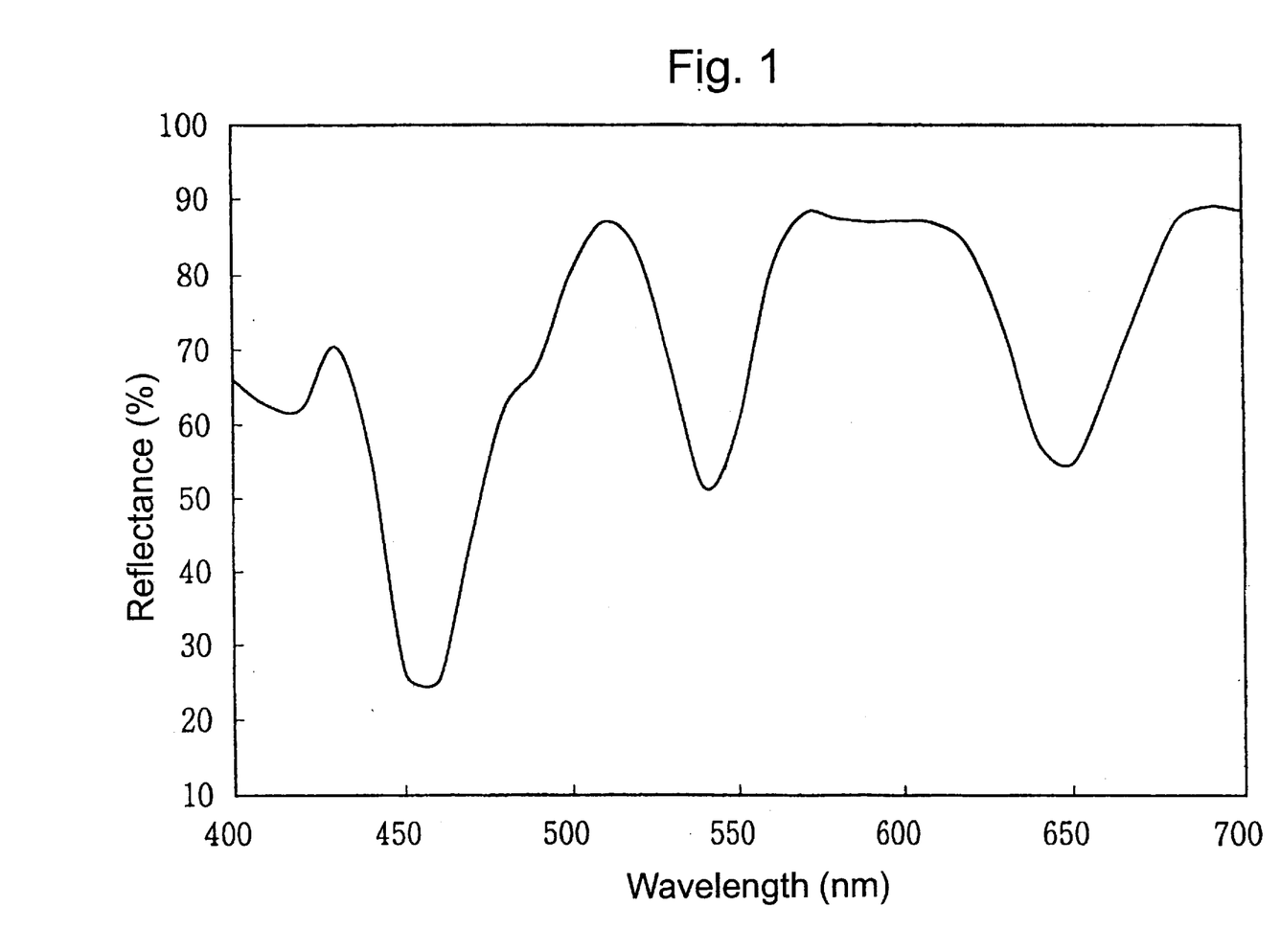
FIG. 1 is a graph showing the reflection distribution of $Ho_2O_3$ in an example of the invention.
Figure 2:
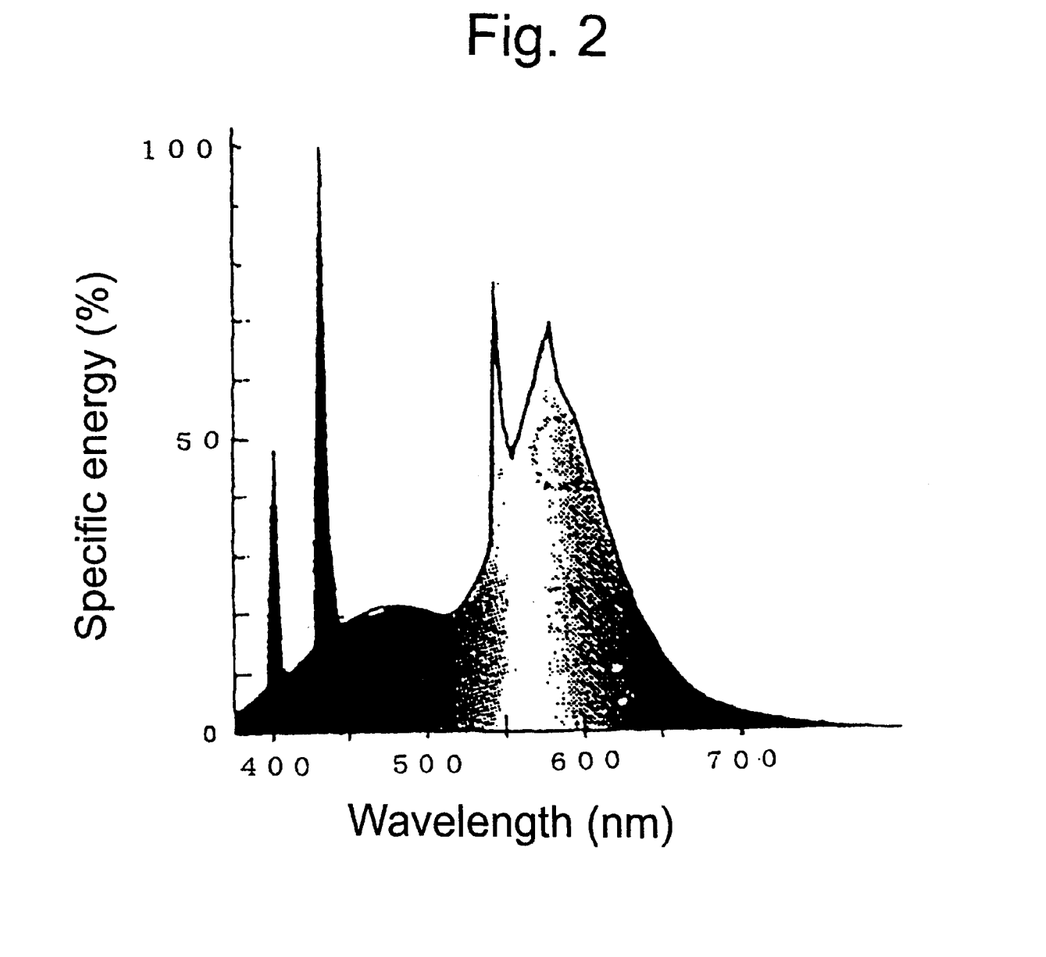
FIG. 2 is a graph showing the light emission distribution of a fluorescent lamp (ordinary type white fluorescent lamp, manufactured by TOSHIBA LIGHTING & TECHNOLOGY CORPORATION, cited from a Toshiba lamp catalogue) in an example of the invention.

As shown in FIG. 1, $Ho_2O_3$ has the principal absorption peaks near 460 nm, 540 nm, and 650 nm. On the other hand, sunlight, which becomes an external light source, has a light of wavelengths from a ultraviolet region to an infrared region and when $Ho_2O_3$ is irradiated by the sunlight, the spectral distribution showing the object color causes absorptions of the wavelengths of near 460 nm, 540 nm, and 650 nm, and the light of other wavelengths is reflected at the reflectance of FIG. 1. As the result thereof, the object color shows a light yellow color. Then, as an example of the external light source, an example of the spectral distribution of a high color rendering type fluorescent lamp or an ordinary type (high-efficient type) fluorescent lamp is shown in FIG. 2 (ordinary type white fluorescent lamp manufactured by TOSHIBA LIGHTING & TECHNOLOGY CORPORATION, cited from a Toshiba lamp catalogue). When $Ho_{2O3}$ is irradiated by the fluorescent lamp as external light source, the wavelengths of near 460 nm, 540 nm, and 650 nm are absorbed, and the light of other wavelengths is reflected at the reflectance of FIG. 1. Because the light emission intensity of each wavelength is low as compared with sunlight, the reflected light intensity in each wavelength is different from the case of sunlight, and as the result thereof, the object color of $Ho_2O_3$ shows the color of from a white color to a light flesh color. The width of color changing is caused by the difference of the deflection spectral distribution according to the kind of a fluorescent lamp.

Figure 3:
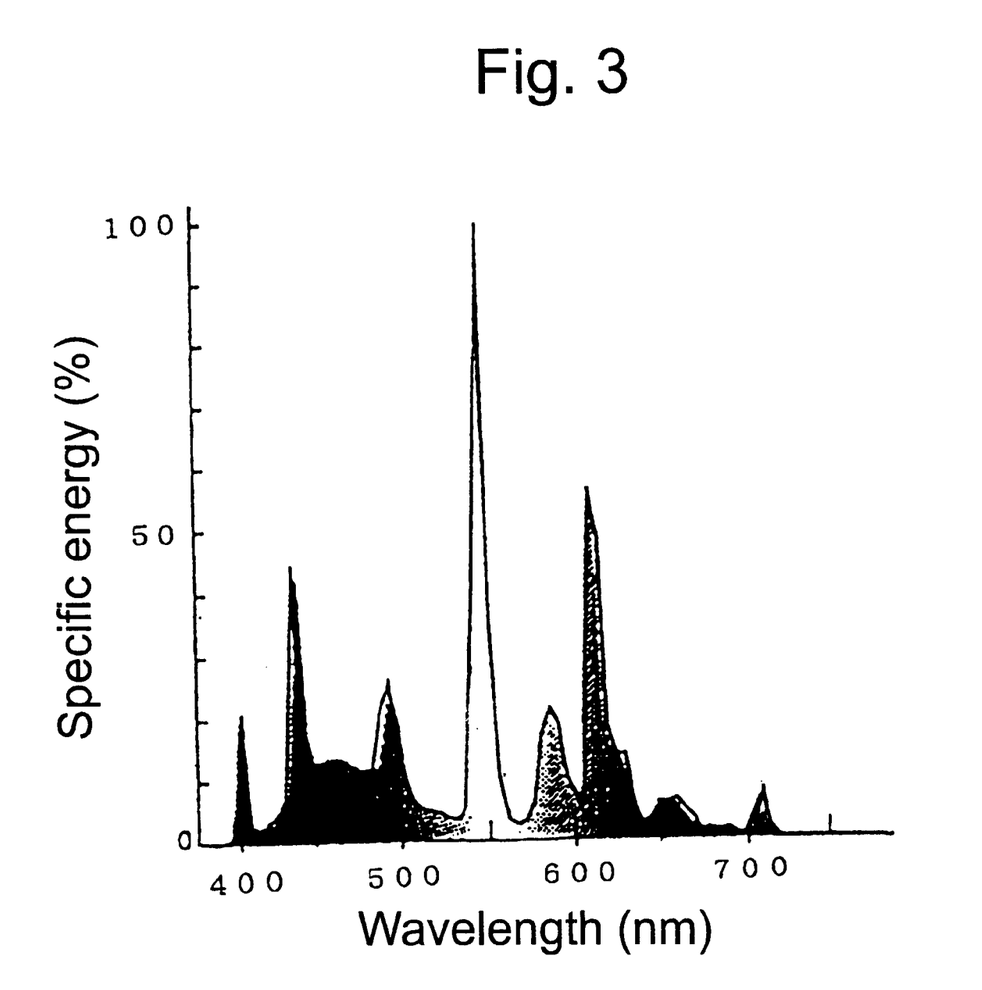
FIG. 3 is a graph showing the light emission distribution of a three-wavelength region light-emitting type fluorescent lamp (Melo 5 N, manufactured by TOSHIBA LIGHTING & TECHNOLOGY CORPORATION, cited from a Toshiba lamp catalogue) in an example of the invention.

Then, the spectral distribution of the three-wavelength region light-emitting type fluorescent lamp is shown in FIG. 3 (Melo 5 N manufactured by TOSHIBA LIGHTING & TECHNOLOGY CORPORATION, cited from a Toshiba lamp catalogue). As shown in FIG. 3, the three-wavelength region light-emitting type fluorescent lamp has large emission lines near 490 nm, 550 nm, and 620 nm. When $Ho_2O_3$ is irradiated by the three-wavelength region light-emitting type fluorescent lamp as an external light source, because of the reflection spectral characteristics shown in FIG. 1, the light near 490 nm contained in the fluorescent lamp is almost absorbed and although the wavelengths near 550 may be reflected to some extent, the light emission intensity becomes low. Also, only the light of the wavelength of 620 nm is intensely reflected. As the results thereof, the object color of $Ho_2O_3$ shows the color of from a light orange color to a flesh color by the wavelength of 550 nm having a low light emission intensity and the wavelength of 620 nm having a high light emission intensity. The width of color changing is caused by the difference of the kind of the three-wavelength region light-emitting type fluorescent lamp.

Also, it is known that. the light emission intensity of $Ho_2O_3$ is not intense but when the oxide absorbs a light of specific wavelengths of blue and green, it emits a red color and it is considered that the light emission of a red color causing in the case of being irradiated by a light of a specific wavelength, that is the light emitting phenomenon contributes to that the subject color is seen as a color of from a light orange color to a flesh color. As described above, by mixing the above-described rare earth oxide in a transparent resin component and applying shaping such as printing, etc., to an external decorating part for a watch, which is exposed to an external light source, the part can show a subject color corresponding to the kind of the external light source and as the result thereof, an expression which has never been obtained can be easily applied to the external part of watch at a low cost. Also, because the fine particles constituting the above-described color changing layer are the oxide, the layer is excellent in the qualities such as the light resistance, the heat resistance, etc., and because the layer is not accompanied by the change of the chemical structure as a photochromic molecule, even when the subject color is repeatedly changed by changing an external light source, the functional property thereof is not spoiled and the color change occurs instantly.

Figure 4:
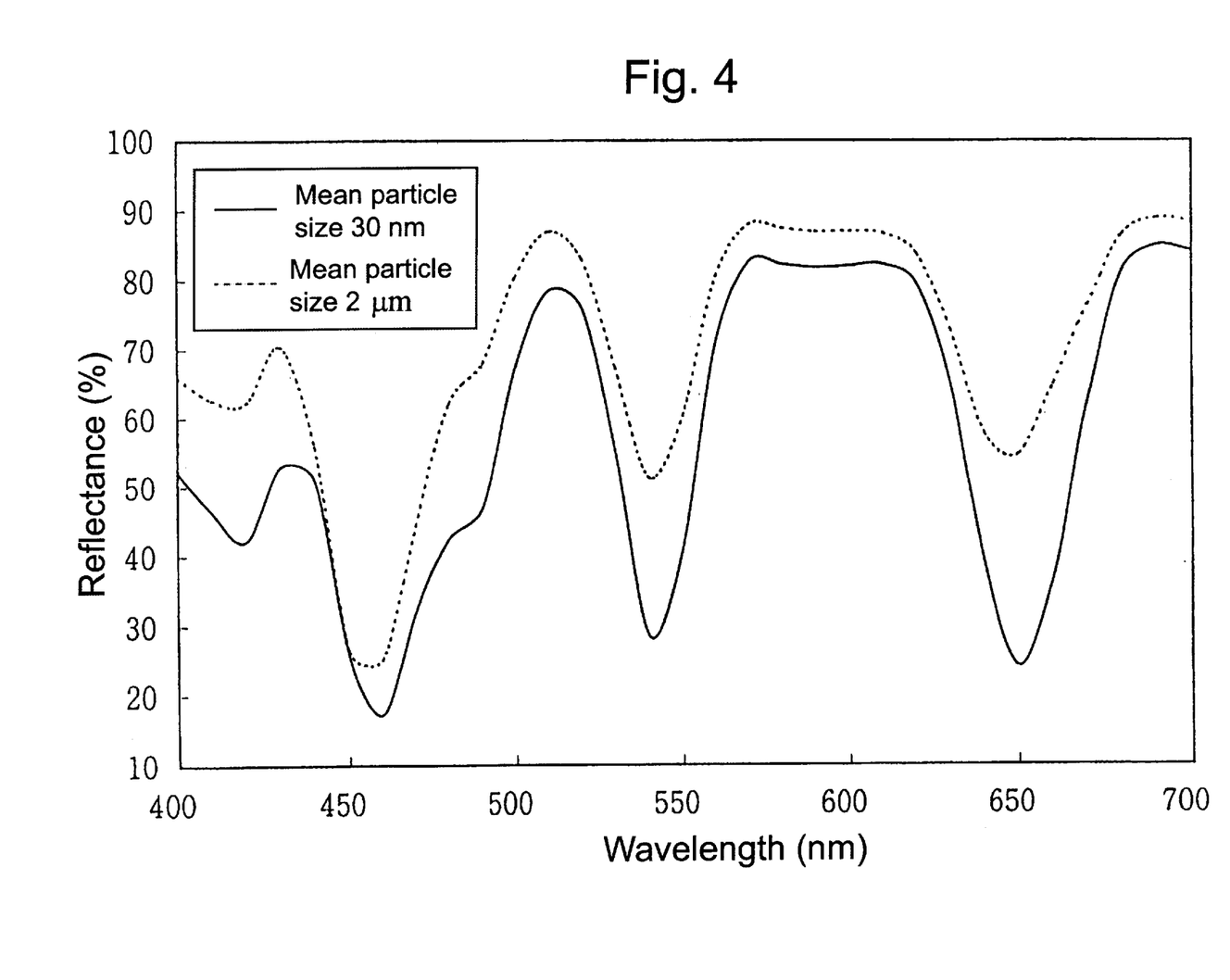
FIG. 4 is a graph showing the reflection optical distributions of $Ho_2O_3$ having different mean particle sizes in an example of the invention.

Also, in such rare earth oxide fine particles, particularly, the super fine particles of a nanometer order have a different reflection spectral characteristics from the above-described rare earth oxide fine particles of a micrometer order. As an example, the reflection spectral characteristics of $Ho_2O_3$ fine particles having a mean particle size of about 2 $\mu$m and the reflection spectral characteristics of $Ho_2O_3$ super fine particles having a mean particle size of about 30 nm are shown in FIG. 4. As shown in FIG. 4, $Ho_2O_3$ has the principal absorption peaks near 460 nm, 540 nm, and 650 nm regardless of the particle sizes but the reflectance is lower in the super fine particles, and in particular, the reflectance largely differs in the absorption regions near 540 nm and 650 nm.

As the result thereof, when the rare earth oxide fine particles are exposed to the three-wavelength region light-emitting type fluorescent lamp having large emission lines near 490 nm, 550 nm, and 620 nm, because in the case of the $Ho_2O_3$ super fine particles, the light of the wavelengths of bear 540 nm and 650 nm is large absorbed, and the emission line near 620 nm contained in the three-wavelength region light-emitting type fluorescent lamp is reflected, the color tone of the $Ho_2O_3$ super fine particles becomes a strong red color and as the result thereof, the subject color becomes a deep pink color. By mixing the above-described rare earth oxide super fine particles in the transparent resin component and applying shaping such as printing, etc., to an external decorating part for a watch, which is exposed to an external light source, the color tone largely changes according to the kind of the external light source and it becomes possible to express a color which has never been obtained.

Also, because such super fine particles have a small surface area, the dispersibility thereof in the case of mixing in a light-transmitting base material such as a transparent high molecular material, etc., is good, and further in the case of applying a screen printing work, a screen plate having a fine mesh size can be used. Also, because the super fine particles are same as the fine particles of a micrometer order in the point of being an oxide, the rare earth super fine particles are excellent in the qualities such as the light resistance, the heat resistance, etc., and because the particles are not accompanied by the change of the chemical structure as in the case of a photochromic molecule, even when the subject color is repeatedly changed by changing an external light source, the functional property is not spoiled and the color occurs instantly.

BEST MODE FOR CARRYING OUT THE INVENTION

The present invention is described in detail based on the following examples.

EXAMPLE 1

Figure 5:
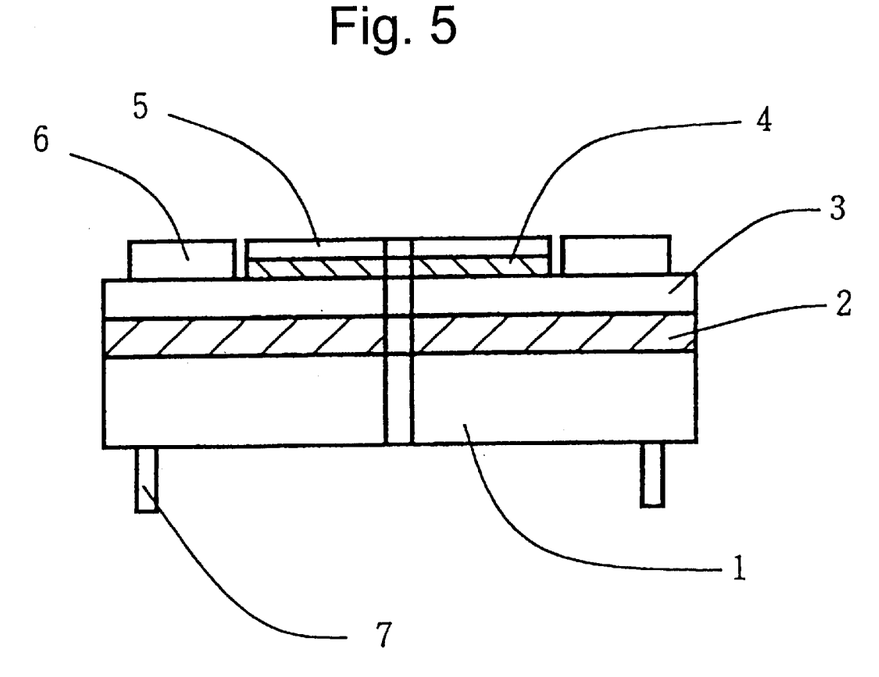
FIG. 5 is a schematic cross-sectional view showing a dial plate for a watch of an embodiment of the invention.

Then, the invention is explained in detail by referring to the accompanied drawing. FIG. 5 is a schematic cross-sectional view showing a dial plate of a watch of an embodiment of the invention. As shown in FIG. 5, a ground metal plated layer 2 is formed on a dial plate substrate 1 made of brass or nickel silver and thereafter a finishing layer 3 is formed by finish plating or coating. Also, to improve the efficiency of color changing, a white layer 4 is partially applied as ground print by screen printing, and a color changing layer 5 is formed on the upper surface of the white layer 4 by screen printing. In addition, abbreviated forms 6 are formed on the finishing layer 3 and at the lower surface side of the dial plate substrate 1 are formed dial plate legs 7.

To 50 parts by weight of a thermosetting type transparent ink made of an epoxymelamine resin as the main constituent was added 50 parts by weight of $Ho_2O_3$ fine particles having a mean particle size of about 2 $\mu$m followed by sufficiently stirring to disperse well the $Ho_2O_3$ fine particles in the transparent ink. In this case, a proper amount of a solvent made of ethylene glycol monobutyl ether as the matin constituent was added thereto to control the viscosity. Also, if necessary, additives such as a wetting agent, etc., may be mixed therewith. Using the above-described ink, screen printing was applied on the upper surface of the white layer 4 of the dial plate and printed layer was cured by baking under the conditions of 150° C. and 30 minutes and drying to form the color changing layer 5 at a thickness of 70 $\mu$m.

The upper surface of the dial plate formed by the above-described construction was irradiated using each of three kinds of light sources, sunlight, a standard light source $D_{65}$ as a high color rendering fluorescent lamp (manufactured by TOSHIBA LIGHTING & TECHNOLOGY CORPORATION, $D_{65}$ fluorescent lamp for color comparison·inspection), and three-wavelength region light-emitting type fluorescent lamp (manufactured by Matsushita Electric Industrial Co., Ltd., Twin fluorescent lamp), and the color of the color changing layer 5 was measured using a color luminance meter (color luminance meter, BM-5A, manufactured by TOPCON CORPORATION). The results are shown in Table 1 below.

[Table 1]

TABLE 1

| External light | Chromaticity | | Appearance color of |
|---|---|---|---|
| Source | a* | b* | color changing layer |
| Sunlight | −4.6 | 19.0 | Light yellow color |
| High rendering fluorescent lamp ($D_{56}$ for color comparison·inspection) | 1.3 | 19.5 | Light flesh color |
| Three-wavelength Region light-emitting type fluorescent lamp | 20.3 | 32.1 | Deep flesh color |

The color changing layer 5 formed by the above-described construction shows a light yellow color when exposed to sunlight, shows a light flesh color when exposed to the fluorescent lamp of a standard light $D_{65}$, and increases the value of a* and shows a deep flesh color when exposed to the three-wavelength region light-emitting type fluorescent lamp. Also, because as the resin component of the color changing layer 5 formed by the above-described constitution, a usually commercially available transparent link can be used, the layer is suitably formed by screen printing, and accordingly, an optional form can be easily formed on the upper surface of the dial plate. The dial plate formed by the above-described constitution does not cause discoloring and fading to a durability test such as the light resistance and the heat resistance and the deterioration of color change does not occur.

EXAMPLE 2

Then, an example of the invention using $Nd_2O_3$ fine particles is shown. To 50 parts by weight of a thermosetting type transparent ink made of an epoxymelamine resin as the main constituent was added 50 parts of $Nd_2O_3$ fine particles having a mean particle size of about 7 μm followed by sufficiently stirring to disperse well the Nd2O3 fine particles in the transparent ink. In this case, a proper amount of a solvent made of ethylene glycol monobutyl ether as the main constituent was added thereto to control the viscosity. Using the above-described ink, screen printing was applied on the upper surface of the white layer 4 of the dial plate and printed layer was cured by baking under the conditions of 150° C. and 30 minutes and drying to form the color changing layer 5 at a thickness of 70 μm.

The upper surface of the dial plate formed by the above-described construction was irradiated using each of three kinds of light sources, sunlight, a standard light source $D_{65}$ as a high color rendering fluorescent lamp (manufactured by TOSHIBA LIGHTING & TECHNOLOGY CORPORATION, $D_{65}$ fluorescent lamp for color comparison·inspection), and three wavelength region light-emitting type fluorescent lamp (manufactured by Matsushita Electric Industrial Co., Ltd., Twin fluorescent lamp), and the color of the color changing layer 5 was measured using a color luminance meter (color luminance meter, BM-5A, manufactured by TOPCON CORPORATION). The results are shown in Table 1 below. As shown in the table, the color changing layer 5 formed by the above-described construction shows a light purple color when exposed to sunlight, and reduces the value of a*, increases the value of b*, and shows a color of from a blue-purple color to a blue color when exposed to the fluorescent lamp of a standard light $D_{65}$ and the three-wavelength region light-emitting type fluorescent lamp.

[Table 2]

TABLE 2

| External light source | Chromaticity | | Appearance color of color changing layer |
|---|---|---|---|
| | a* | b* | |
| Sunlight | 1.3 | −19.9 | Light purple color |
| High rendering fluorescent lamp ($D_{56}$ for color comparison•inspection) | 0.2 | −15.0 | Blue-purple color |
| Three-wavelength Region light-emitting type fluorescent lamp | −4.6 | −7.9 | Blue color |

EXAMPLE 3

Then, an example of the invention using $Pr_2O_3$ fine particles is shown. To 50 parts by weight of a thermosetting type transparent ink made of an epoxymelamine resin as the main constituent was added 50 parts by weight of $Pr_2O_3$ fine particles having a mean particle size of about 10 μm followed by sufficiently stirring to disperse well the $Pr_2O_3$ fine particles in the transparent ink. In this case, a proper amount of a solvent made of ethylene glycol monobutyl ether as the main constituent was added thereto to control the viscosity. Using the above-described ink, screen printing was applied on the upper surface of the white layer 4 of the dial plate and printed layer was cured by baking under the conditions of 150° C. and 30 minutes and drying to form the color changing layer 5 at a thickness of 70 μm.

The upper surface of the dial plate formed by the above-described construction was irradiated using each of three kinds of light sources, sunlight, a standard light source $D_{65}$ as a high color rendering fluorescent lamp (manufactured by TOSHIBA LIGHTING & TECHNOLOGY CORPORATION, $D_{65}$ fluorescent lamp for color comparison·inspection), and three wavelength region light-emitting type fluorescent lamp (manufactured by Matsushita Electric Industrial Co., Ltd., Twin fluorescent lamp), and the color of the color changing layer 5 was, measured using a color luminance meter (color luminance meter, BM-5A, manufactured by TOPCON CORPORATION). The results are shown in Table 1 below. As shown in the table, the color changing layer 5 formed by the above-described construction shows a light yellow-green color when exposed to sunlight or the fluorescent lamp of a standard light $D_{65}$, and reduces the value of a*, increases the value of b*, and shows a yellow-green color when exposed to the three-wavelength region light-emitting type fluorescent lamp.

[Table 3]

TABLE 3

| External light source | Chromaticity | | Appearance color of color changing layer |
|---|---|---|---|
| | a* | b* | |
| Sunlight | −11.3 | 12.9 | Light yellow-green color |
| High rendering fluorescent lamp ($D_{56}$ for color comparison•inspection) | −11.3 | 18.9 | Light yellow-green color |
| Three-wavelength Region light-emitting type fluorescent lamp | −15.1 | 39.7 | Yellow-green color |

EXAMPLE 4

Figure 6:
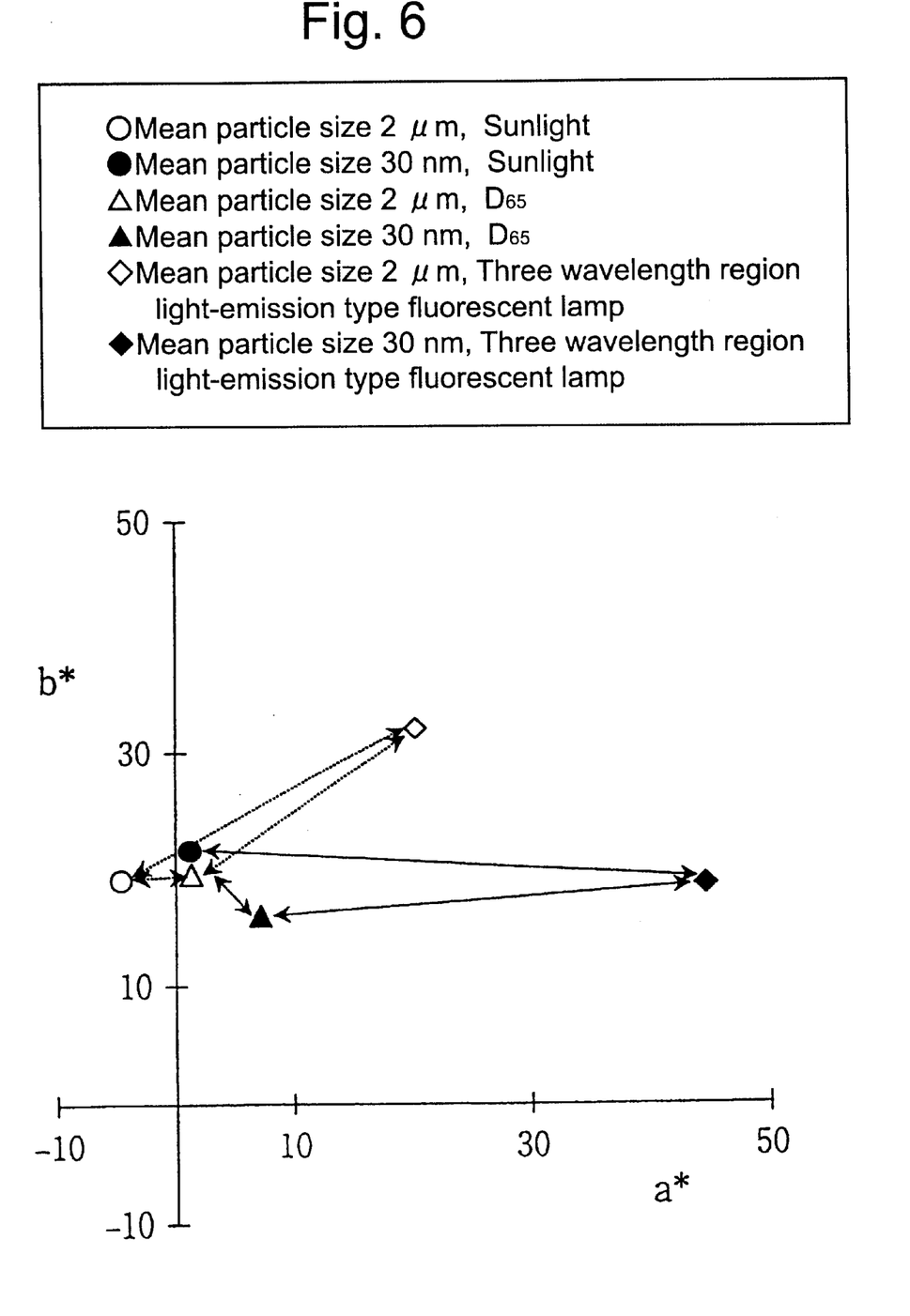
FIG. 6 is an a'b' colorimetric system chromaticity diagram showing the color tone change of the color changing layer of an embodiment of the invention.

By following the same procedure as Example 1 except that $Ho_2O_3$ super fine particles having a mean particle size of about 30 nm were used in place of the $Ho_2O_3$ fine particles having a mean particle size of about 2 μm, a color changing layer 5 was formed at a thickness of 70 μm. The upper surface of the dial plate formed by the above-described constitution was irradiating using each of three kinds of light sources of sunlight, a standard light source $D_{56}$ as the high color rendering fluorescent, and the three wavelength region light-emitting type fluorescent lamp, and the color of the color changing layer 5 was measured using the color luminance meter. The results are shown in Table 4 and FIG. 6.

[Table 4]

TABLE 4

| External light source | Chromaticity | | Appearance color of color changing layer |
|---|---|---|---|
| | a* | b* | |
| Sunlight | 1.2 | 21.5 | Light yellow color |
| High rendering fluorescent lamp ($D_{56}$ for color comparison•inspection) | 7.2 | 15.9 | Light pink color |
| Three-wavelength Region light-emitting type fluorescent lamp | 44.6 | 18.6 | Deep pink color |

The color changing layer 5 formed by the above-described construction shows a light yellow color when exposed to sunlight, shows a light pink color when exposed to the fluorescent lamp of a standard light $D_{65}$, and increases the value of a* and shows a deep pink color when exposed to the three-wavelength region light-emitting type fluorescent lamp. On the other hand, about the color of the color changing layer of Example 1 using the $Ho_2O_3$ fine particles having the mean particle size of about 2 μm, because the value of a* is not largely changed as the case of the above-described $Ho_2O_3$ super fine particles even in the state of being exposed to the three-wavelength region light-emitting type fluorescent lamp, the subject color becomes a deep flesh color.

As described above, when the $Ho_2O_3$ super fine particles are used, in the subject color of the color changing layer, the changed amount of the a* value becomes twice as large and the color tone is largely changed. Thereby, the color, which could not be expressed by the $Ho_2O_3$ fine particles having a mean particle size of a micrometer order, can be expressed using the super fine particles. Also, because as the high molecular material component of the color changing layer 5 formed by the above-described constitution, an ordinary commercially available transparent ink can be used, the layer is suitably formed by screen printing and thus, an optional form can be easily formed on the upper surface of the dial plate. The dial plate formed by the above-described constitution does not cause discoloring and fading to a durability test such as the light resistance and the heat resistance and the deterioration of color change does not occur.

EXAMPLE 5

Then, by following the same procedure as Example 2 except that $Nd_2O_3$ super fine particles having a mean particle size of about 30 nm were used in place of the $Nd_2O_3$ fine particles having a mean particle size of about 7 μm, a color changing layer 5 was formed at a thickness of 70 μm.

When the upper surface of the dial plate formed as described above was irradiating by each of three kinds of light sources of sunlight, a standard light source $D_{56}$ as the high color rendering fluorescent, and the three wavelength region light-emitting type fluorescent lamp, the color of the color changing layer 5 shows a light purple color when exposed to sunlight, and shows a blue color when exposed to the fluorescent lamp of the standard light source $D_{56}$ and the three wavelength region light-emitting type fluorescent lamp. As compared with the color changing layer of Example 2 using the $Nd_2O_3$ fine particles having a mean particle size of about 7 μm, it has been seen that the color changing layer 5 of the present example shows a deep blue color and the color which could not been expressed by the $Nd_2O_3$ fine particles of a micrometer order, can be expressed.

EXAMPLE 6

Then, by following the same procedure as Example 3 except that $Pr_2O_3$ super fine particles having a mean particle size of about 30 nm were used in place of the $Pr_2O_3$ fine particles having a mean particle size of about 10 μm, a color changing layer 5 was formed at a thickness of 70 μm.

When the upper surface of the dial plate formed as described above was irradiating by each of three kinds of light sources of sunlight, a standard light source $D_{56}$ as the high color rendering fluorescent, and the three wavelength region light-emitting type fluorescent lamp, the color of the color changing layer 5 shows a light yellow color when exposed to sunlight, shows a yellow-green color when exposed to the fluorescent lamp of the standard light source $D_{56}$, and shows a deep yellow-green color when exposed to the three wavelength region light-emitting type fluorescent lamp. As compared with the color changing layer prepared by the method of Example 3 using the $Pr_2O_3$ fine particles having a mean particle size of about 10 μm, the color changing layer of the present example shows deeper yellow-green in the state of being exposed to the three wavelength region light-emitting type fluorescent lamp. As described above, it has been confirmed that when such super fine particles of a nanometer order are used, it is possible to form the color changing layer showing a larger color tone change than the case of using rare earth oxide fine particles of a micrometer order.

EXAMPLE 7

Then, an example about an external decorating part for a watch formed by kneading the above-described rare earth oxide fine particles with a transparent resin material is described in detail.

Using pellets obtained by kneading 100 parts by weight of a polycarbonate resin as a transparent resin with 10 parts by weight of $Ho_2O_3$ fine particles having a mean particle size of about 2 μm and granulating the kneaded mixture, a side which is an external decorating part for watch was formed by injection molding. When the molded product obtained was placed under each of three kinds of light sources of sunlight, a standard light source $D_{65}$ as a high color rendering fluorescent lamp (manufactured by TOSHIBA LIGHTING & TECHNOLOGY CORPORATION, $D_{65}$ fluorescent lamp for color comparison·inspection), and a three wavelength region light-emitting type fluorescent lamp (manufactured by Matsushita Electric Industrial Co., Ltd., Twin fluorescent lamp), the subject color was measured using a color luminance meter (color luminance meter, BM-5A, manufactured by TOPCON CORPORATION). The results are shown in Table 4 below. As shown in the table, the molded product formed by the above-described constitution shows a light yellow color when exposed to sunlight, increases the value of a* and shows a light flesh color when exposed to the fluorescent lamp of the standard light source $D_{56}$, and increases the values of a* and b* and shows a deep flesh color when exposed to the three wavelength region light-emitting type fluorescent lamp.
[Table 5]

TABLE 5

| External light source | Chromaticity | | Appearance color of color changing layer |
|---|---|---|---|
| | a* | b* | |
| Sunlight | −4.0 | 18.6 | Light yellow color |
| High rendering fluorescent lamp ($D_{56}$ for color comparison·inspection) | −1.1 | 18.8 | Light flesh color |
| Three-wavelength Region light-emitting type fluorescent lamp | 18.4 | 31.1 | Deep flesh color |

EXAMPLE 8

By following the same procedure as Example 7 except that $Ho_2O_3$ super fine particles having a mean particle size of about 30 nm were used in place of the $Ho_2O_3$ fine particles having a mean particle size of about 2 μm, a side which is an external part for a watch was formed.

When the molded product obtained was placed under each of three kinds of light sources of sunlight, a standard light source $D_{65}$ as a high color rendering fluorescent lamp, and a three wavelength region light-emitting type fluorescent lamp, the subject color shows a light yellow color when exposed to sunlight, shows a light pink color when exposed to the fluorescent lamp of the standard light source $D_{65}$, and shows a deeper pink color when exposed to the three wavelength region light-emitting type fluorescent lamp.

On the other hand, the color of the side molded in Example 7 using the $Ho_2O_3$ fine particles having a mean particle size of about 8 μm shows a deep flesh color in the state of being exposed to the three wavelength region light-emitting type fluorescent lamp. As described above, it has been confirmed that by using the $Ho_2O_3$ super fine particles of the nanometer order, in the state of being exposed to a fluorescent lamp, the color, which could not be expressed by the $Ho_2O_3$ fine particles of the micrometer order, can be expressed.

EXAMPLE 9

Then, other example of the invention is explained in detail by referring to the accompanied drawing.

Figure 7:
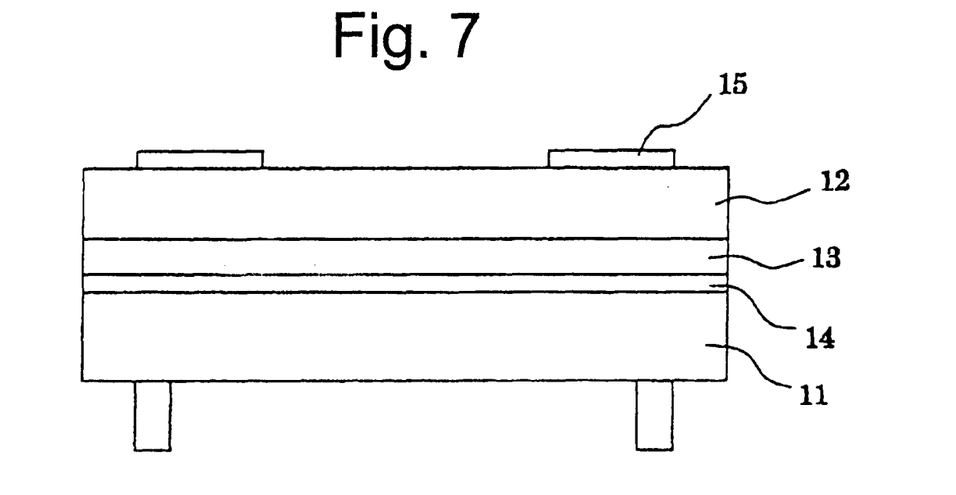
FIG. 7 is a schematic cross-sectional view showing a dial plate for a watch of other embodiment of the invention.

FIG. 7 is a schematic cross-sectional view of a dial plate of a watch of other example of the invention. As shown in FIG. 7, on a dial plate substrate 11 made of brass or nickel silver is disposed a light-transmitting substrate 12. In the present example, the light-transmitting substrate is a thin sheet of a white pearl-oyster's shell. On the back surface side of the light-transmitting plate 12 is formed a color changing layer 13 and the light-transmitting plate 12 and the color changing layer 13 are adhered to the upper surface of the dial plate substrate 11 via an adhesive layer 14. In addition, print 15 such as time letters, etc., is formed on the light-transmitting substrate 12. Also, the color changing layer 13 can be formed using the ink used in Examples 1 to 6 described above.

In such a construction, on the upper surface of the dial plate, the color of the color changing layer 13 under the light-transmitting substrate 12 made of the white pearl-oyster's shell appears. Also, because the color of the color changing layer 13 changes by the kind of an external light source, the color tone of the white pearl-oyster's shell becomes a cream color under sunlight, becomes a light flesh color under an ordinary type fluorescent lamp (standard light source $D_{65}$), and becomes a deep pink color under a three wavelength type fluorescent lamp, whereby the expression of the white pearl-oyster's shell, which has not hitherto been expressed, can be expressed.

In this case, the light-transmitting substrate 12 may be a material having a light transmittance, and further may be a transparent high molecular material layer containing a noble stone such as sardnix, etc., or a pearl powder. It is not necessary that the color changing layer 13 is formed wholly but the layer may be formed partially or a pattern-form such as a design, a mark, etc.

EXAMPLE 10

Figure 8:
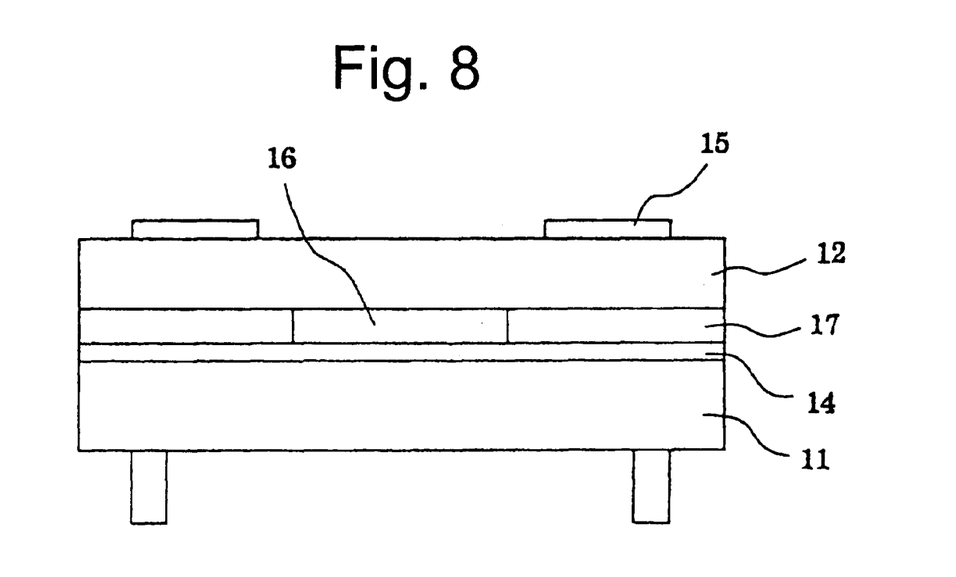
FIG. 8 is a schematic cross-sectional view showing a dial plate for a watch of a still other modified embodiment of the invention.

FIG. 8 shows a modified example of Example 9. In the present example, a color changing layer 16 is partially formed in a printed layer at the back surface side of the light-transmitting substrate 12 in, for example, a pattern form and also a background layer 17 is formed at other portions of the printed layer. In this case, the background layer 17 may emphasize the color of the color changing layer 16. When the color of the background layer 17 is same as the color of the color changing layer 16 under a certain light source, it gives an effect of a concealed print and the color changing layer 16 first appears under other light source.

INDUSTRIAL APPLICABILITY

As described above in detail, according to the present invention, because the color of the color changing layer formed at a part of an external decorating part for a watch, such as a dial plate, etc., is changed by the relation of the absorption distribution characteristics of the above-described rare earth oxide constituting the color changing layer and the light-emission distribution of the light source, the color can be instantly changed according to sunlight and a fluorescent lamp, or further the kind of a fluorescent lamp, whereby plural colors can be expressed. Also, by changing the compounding ratio of the transparent resin and the above-described rare earth oxide, the shades of color can be controlled, and further, by using $Nd_2O_3$ or $Pr_2O_3$ is used in place of $Ho_2O_3$, the color variation can be expanded.

As described above, by forming a member containing the color changing layer having the above-described constitution, an external decorating part such as the dial plate for a watch, which has not hitherto been expressed, is obtained. Also, as shown in claim 1 described below, because the color changing layer is formed by working such as screen printing, etc., using an ink or a coating material containing the above-described rare earth oxide, the color changing layer of an optional form can be formed on the upper surface of an external decorating part for watch easily and at a low cost.

Moreover, raw material pellets are prepared by kneading the above-described rare earth oxide in a transparent resin such as polycarbonate and granulating the kneaded mixture and by applying a molding work such as injection molding to the pellets, external parts for watches such as a frame, a band, a bezel, buttons, etc., can be formed and watches wherein the color is reversibly changed in an environment having a different light source, which have not hitherto been obtained, can be realized. Also, because the color change is caused by the absorption-reflection specific to the above-described rare earth oxide, the reversibility of the color change is complete, the speed of the color change is fast, and also a light deterioration does not accompanied, whereby the qualities such as the light resistance, the heat resistance, etc., can be sufficiently ensured.

In the invention, in particular, when super fine particles having a mean particle size of a nanometer order are used, the color tone is more largely changed than the fine particles of a micrometer order of the same compound and as the result thereof, a color, which has not hitherto been expressed, can be expressed. Also, by changing the compounding ratio of a transparent resin and the rare earth oxide super fine particles or the rare earth oxide fine particles, the shades of color can be controlled. As described above, by forming the member containing the color changing layer of the above-described constitution, the color capable of being expressed can be increased and it can be cope with any demand of design.

Also, because the surface area of the rare earth oxide super fine particles of a nanometer order, the particles are excellent in the dispersibility. Thus, the particles are suitable for the preparation of an ink as well as in the case of screen printing, a screen plate having a small mesh size can be used, whereby the effect of improving the appearance of print is also obtained.

What is claimed is:

1. A reversibly discoloring ink composition comprising: a light-transmissive base material; and fine particles of one or more rare earth oxides having the formula $M_2O_3$, wherein M represents Ho, Nd, or Pr, dispersed in the base material, the mean particle size of the rare earth oxide fine particles being from 5 nm to 100 nm.

2. A reversibly discoloring composition according to claim 1; wherein the light-transmissive base material is selected from the group consisting of an epoxymelamine-based material, a vinyl-based material, an acryl-based material, a urethane-based material, a polyamide-based material, an alkid-based material, an amino-based material, and a photo-setting material.

3. A reversibly discoloring ink composition according to claim 2; wherein the light-transmissive base material is usable as a printable ink and the content of the rare earth oxide fine particles is from 1 to 50 parts by weight to 100 parts by weight of the base material.

4. A reversibly discoloring ink composition according to claim 1; wherein the content of the rare earth oxide fine particles is from 1 to 30 parts by weight to 100 parts by weight of the light-transmissive base material.

5. A reversibly discoloring ink composition according to claim 1; wherein the rare earth oxide fine particles comprise a mixture of rare earth oxide fine particles of at least one of the rare earth oxides selected so that when dispersed in the light-transmissive base material the mixture changes between desired colors when exposed to light of different wavelength distributions.

6. A reversibly discoloring ink composition according to claim 5; wherein the selected fine particles have a mean size effective to cause the ink composition to take on different desired colors in response to illumination by light of different wavelength distributions.

7. An external part for a wristwatch, comprising: a reversibly color-changing portion composed of a light-transmissive base material and fine particles of one or more rare earth oxides represented by the formula $M_2O_3O$, wherein M represents Ho, Nd, or Pr, dispersed in the light-transmissive base material, the mean particle size of the rare earth oxide fine particles being from 5 nm to 100 nm; and a constant-color portion which does not change in color surrounding the color-changing portion.

8. An external part for a wristwatch according to claim 7; wherein the light-transmissive base material comprises a screen-printable ink base material having the rare earth oxide fine particles dispersed therein to form a printable color-changing ink, and the color changing-portion comprises a printed layer of the printable color-changing ink.

9. An external part for a wristwatch according to claim 8; wherein the light-transmissive base material is an ink or a coating material selected from the group consisting of an epoxymelamine-based material, a vinyl-based material, an acryl-based material, a urethane-based material, a polyamide-based material, an alkid-based material, an amino-based material, and a photo-setting material.

10. An external part for a wristwatch according to claim 7; wherein the light-transmissive base material comprises a transparent molding material having the rare earth oxide fine particles dispersed therein to form an injection-moldable color-changing material, and the color-changing portion comprises a color changing member formed by molding the injection-moldable color-changing material.

11. An external part for a wristwatch according to claim 10; wherein the transparent molding material is selected from the group consisting of an acryl material, a polycarbonate material, an ABS material, a polyarylate material, a urethane-based material, a styrene-based material, and a silicone-based material.

12. An external part for a wristwatch according to claim 7; wherein the color-changing portion changes in color reversibly and instantly according to a wavelength distribution of an external light source illuminating the color-changing portion so that the color-changing portion exhibits different colors when exposed to each of sunlight, an ordinary fluorescent lamp, and a three-wavelength region light-emitting fluorescent lamp.

13. An external part for a wristwatch according to claim 7; wherein the color-changing portion is covered by a transparent layer or a member composed of a light-transmitting material.

14. An external part for a wristwatch according to claim 7; wherein the constant-color portion surrounding the color-changing portion has the same color as that taken on by the color-changing portion in response to illumination by light of a given wavelength distribution.

15. An external part for a wristwatch according to claim 7; wherein the color-changing portion is provided as a pattern having a desired shape, and a color of the constant-color portion surrounding the color-changing portion is the same as that of the color-changing portion when the color-changing portion is exposed to light having a given wavelength distribution and the color-changing portion changes color to reveal the pattern when the color-changing portion is exposed to light of another given wavelength distribution.

16. A method of producing a color-changing material comprising the steps of:

provoding a quantity of one or more rare earth oxides having the formula $M_2O_3$, wherein M represents Ho, Nd, or Pr, the mean particle size of the fine particles being from 5 nm to 100 nm and the rare earth oxides being effective to change color when illuminated by light of different wavelength distributions;

producing a mixture of fine particles of the one or more rare earth oxides, the mixture of fine particles selected from the one or more rare earth oxides based upon light absorption and reflection characteristics thereof so that the mixture of fine particles changes between desired colors when exposed to light of different wavelength distributions; and dispersing the fine particles into a transparent base material.

17. A method of producing a color-changing material according to claim 16; further comprising the step of selecting fine particles having a given mean size to take on desired colors in response to illumination by light of a different wavelength distributions.

18. A method of producing a color-changing material according to claim 16; wherein the transparent base material is selected from the group consisting of an epoxymelamine-based material, a vinyl-based material, an acryl-based material, a urethane-based material, a polyamide-based material, an alkid-based material, an amino-based material, and a photo-setting material.

19. A method of producing a color-changing material according to claim 16; wherein the transparent base material is selected from the group consisting of an acryl material, a polycarbonate material, an ABS material, a polyarylate material, a urethane-based material, a styrene-based material, and a silicone-based material.

20. A method of producing a color-changing material according to claim 16; wherein the transparent base material is a base material for an ink and the content of the fine particles is from 1 to 50 parts by weight to 100 parts by weight of the base material.

21. A method of producing a color-changing material according to claim 16; wherein the content of the fine particles is from 1 to 30 parts by weight to 100 parts by weight of the transparent base material.

* * * * *